Dec. 3, 1935.    I. R. ABBOTT    2,023,188
AUTOMOBILE TOP
Original Filed Dec. 19, 1930
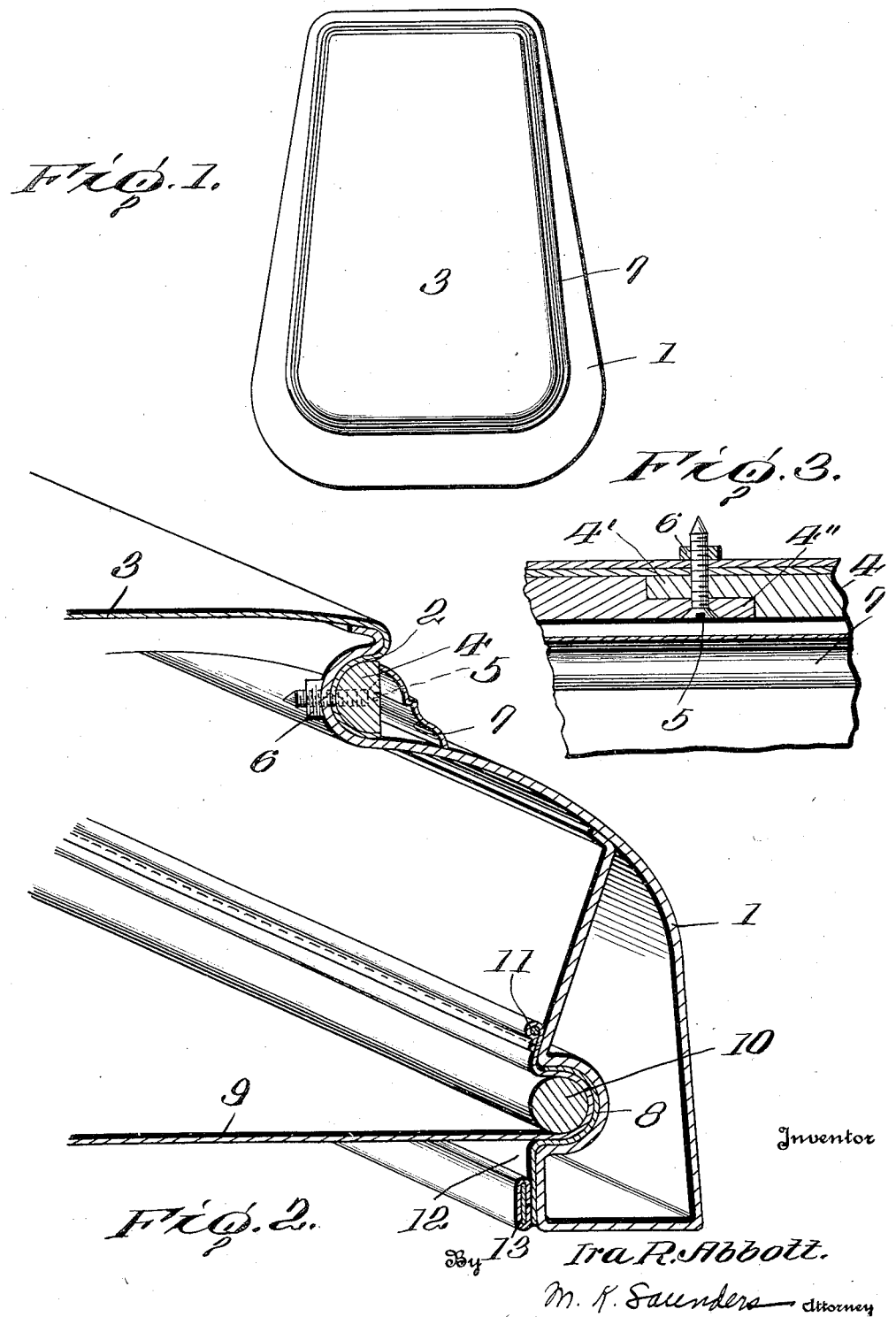
Inventor
Ira R. Abbott.
By M. K. Saunders — Attorney Patented Dec. 3, 1935

2,023,188

UNITED STATES PATENT OFFICE 2,023,188

AUTOMOBILE TOP

Ira Reynald Abbott, Pensacola, Fla.

Application December 19, 1930, Serial No. 503,597
Renewed May 16, 1935

5 Claims. (Cl. 296—137)

This invention relates to automobile tops and method of assembling the same.

It is well known that automobile tops in which wood is employed either for the frame or for braces, will soon deteriorate owing to the effect which moisture has upon wood; even in constructions where the wooden portion is entirely covered by the fabric, this deterioration will take place owing to the fact that the atmospheric moisture will penetrate the fabric and act upon the wood.

The object of my invention is therefore to provide an automobile top constructed entirely from metal and fabric.

Another object of the invention is to provide an automobile top in which the fabric portion may be easily installed and easily replaced when it becomes worn.

Another object of the invention is to provide an automobile top in which the use of wood is entirely eliminated.

I accomplish the above, and other objects of the invention which will be apparent as the description proceeds, by means of the construction shown in the accompanying drawing in which:

Figure 1 is a plan view of an automobile top constructed according to my invention;

Figure 2 is a vertical section through the Figure 1, partly broken away;

Figure 3 is a section of a detail.

On the drawing, in which like reference characters indicate like parts on all of the views thereof, 1 indicates the metal deck frame of the automobile top which is preferably stamped out from metal and of hollow formation around the lower portion thereof, as is clearly shown in Figure 2. The deck frame is formed with a groove 2 along the upper circumference thereof into which the fabric top 3 is clamped by means of the rod 4 which is formed of spring metal. The rod 4 is held in the groove 2 by means of screws 5 which are screwed into the nuts 6, the nuts 6 being welded to the interior of the deck frame 1. In order to provide a neat and attractive finish, the cornice 7, also formed of spring metal, is located around the rod 4.

On the interior of the deck frame 1, a second groove 8 is formed, this groove being positioned slightly above the lower face of the deck frame. The lining or ceiling member 9 is clamped in the groove 8 through the medium of a spring rod 10, which is preferably of such form and resiliency that it does not require any additional means for securing it in the groove 8. The ceiling member 9 has its circumference secured to a wire or cleat 11 which is here shown as of circular cross section although it is apparent that this member might be rectangular in cross section and fastened to the fabric by means of screws or other suitable fastening means.

In order to provide a neat finish for the interior of the deck below the ceiling member 9, a strip of fabric 12 is also clamped in the groove 8 by means of the spring rod 10. This fabric finishing portion is provided on its lower edge with a cleat, preferably of rectangular form. The finishing member 12 is herein shown as folded around the cleat 13 but it is obvious that any other suitable securing means may be employed which will provide the desirable neat finish.

In assembling an automobile top of the form covered by my invention, the inner lining 9 is first stretched and secured to the cleats or rod 11 and then secured in proper position; the top 3 is stretched across the opening in the deck frame and secured by the rod 4. When the screws 5 are properly threaded into the nuts 6, it will be seen that the entire assemblage has been accomplished. The overlapping ends of the rod 4 are preferably kerfed so as to provide a neat finish as is shown at 4' and 4'' in Figure 3. The use of the cornice 7 is entirely optional although it contributes to the pleasing appearance of the construction.

It will thus be seen that an entirely novel water-proof automobile top constructed according to my invention will be formed from metal, comprising the deck frame and the spring rods and fastening means, with a fabric roof and lining so attached to the metal deck frame that it may be easily installed and replaced when worn.

While I have not shown cross struts extending across the opening in the deck frame 1, it is to be understood that metal cross struts may be employed if desired.

Having thus described my invention what I claim as new and desire to secure by Letters Patent is:—

1. An automobile top comprising a metal frame, said frame having an inner and an outer wall, a fabric roof secured to said outer wall the inner wall of said frame having a circumferential groove above the lower plane thereof, a fabric ceiling extending across the lower portion of said frame with its edges extending upwardly, a portion of the upwardly extending edges being positioned in said groove and means for detachably securing the said fabric portion in the groove, said means consisting of a resilient rod positioned over said portion and detachably seated in said groove.

2. An automobile top comprising a metal frame, the lower edges of said frame extending inwardly and upwardly to provide a hollow structure, the inner wall of said frame having a circumferential groove therein, said groove being spaced from the bottom of the frame, a fabric strip covering the wall of the frame below the groove with its upper edge seated in said groove, a fabric ceiling extending across the interior of the frame and provided with an upwardly extending portion seated in said groove, and means consisting of a spring rod for detachably securing the strip and ceiling in said groove.

3. A hollow metal frame for an automobile top comprising an outer wall, an inner wall spaced from said outer wall, and a connecting lower member, means whereby a roof and ceiling may be secured to said frame, said means comprising an outwardly facing groove in said outer wall below the upper plane thereof and an inwardly facing groove in said inner wall above the lower plane thereof, said outer wall being outwardly rounded below the groove therein.

4. A hollow frame for an automobile top comprising an outer wall, an inner wall, and a connecting lower wall, means whereby a roof and ceiling may be secured to said frame, said means comprising an outwardly facing groove in said outer wall below the upper plane thereof and an inwardly facing groove in said inner wall above the lower plane thereof, said inner and outer walls being secured to each other at a point between said grooves.

5. An automobile top comprising a frame consisting of a strip of metal with its upper edge extending inwardly, the metal strip being bent upon itself below said upper edge to form a smooth rounded surface, said strip having an outwardly opening groove below said rounded surface and curved outwardly and downwardly therefrom to provide an open frame for the top, a fabric deck having its edges seated in said groove and extending over said rounded surface, a resilient strip mounted in and substantially filling said groove and covering said deck edges, and a resilient element covering the joint between said resilient strip and the groove.

IRA REYNALD ABBOTT.